3,318,655
POLYPROPYLENE-POLYCARBONATE MIXED RESIN FIBER, ITS PRODUCTION AND DYEING THEREOF
Morio Naka, Urawa, Choji Yuyama, Saitama, and Osamu Nakajima, Ehime, Japan, assignors to Fuji Spinning Co., Ltd., Tokyo, Japan
No Drawing. Filed Dec. 15, 1960, Ser. No. 75,942
Claims priority, application Japan, Dec. 18, 1959, 34/39,328
11 Claims. (Cl. 8—55)

The present invention relates to a method of producing crystalline polypropylene with enhanced dyeing properties. It also relates to the corresponding spun dyeable and/or dyed fibers or other shaped articles.

A primary objective of the invention is to obtain an easily dyeable polymeric material comprising crystalline propylene polymer and further to produce therefrom synthetic fiber having good dyeing property. In general, fibers produced from propylene polymeric material with crystalline structure or the corresponding shaped articles are superior in their characteristics, such as mechanical strength, resilience, Young's ratio, specific gravity, etc. to other natural or synthetic fibers. However, the fibers or the corresponding shaped articles made from the above-mentioned polymeric material can be affected by a swelling agent only to very little degree and show very poor affinity to dyes or pigments because of the chemical and physical properties of the said polymeric material; consequently it is very difficult to dye the said fibers or shaped articles by a conventional dyeing method. This difficulty constitutes a great hindrance against the development of the propylene polymeric materials in the fields of woven or knitted products, particularly of apparel or products for decorative use. One way of overcoming the above-stated drawback is to commingle a high polymeric material in the molten state with propylene polymer, said high polymeric material containing a functional group favoring the absorption of a swelling agent and correspondingly improving the affinity to dyes or pigments, and said high polymeric material further being capable of stable coexistence together with the propylene polymer. It may be that by commingling such high polymeric material, capillary fine pores formed in the propylene polymer provide the necessary effect for physical acceleration of absorption of swelling agents and dyes or pigments.

The present invention is addressed to the problem of obviating the above-discussed drawbacks. This goal is achieved, according to this invention, by the expedient of incorporating an aromatic polycarbonate—i.e. one of the recently developed thermoplastic polymers known as polycarbonate resins and usually prepared by the reaction between e.g. so-called bis-phenol A and phosgene—into crystalline propylene polymer in an amount of 1 to 20% by weight, and preferably of 3 to 10% by weight, relative to the weight of the said crystalline polymer, and then converting the resultant mixture into the form of fiber or shaped articles, e.g. by means of an appropriate melt spinning apparatus or the like. The thus-prepared fiber or shaped articles retain the mechanical and physical characteristics of said crystalline propylene polymer in essentially unchanged form, while the surface characteristics such as whiteness, dull luster, comfortable feel, and pleasing appearance, and also fastness to light as well as dyeing affinity, are remarkably improved.

The aforesaid 1 to 20% range of polycarbonate resin to be added is not without significance. Thus, when less than 1% of polycarbonate resin is used, dyeing affinity of satisfactory magnitude is not realized, and when more than 20% of polycarbonate resin is employed, the crystalline polymeric propylene fiber material tends to be adversely affected and, in particular, its flexibility and elasticity are reduced and its spinnability in a melt spinning apparatus is remarkably impaired.

The extruded filaments from the spinning machine or other extrusion apparatus are preferably subjected to stretch orientation to produce filaments of the desired fineness, which is then advantageously stabilized by heat treatment, these "aftertreatments" being per se essentially conventional in character.

The polycarbonate resin employed preferably has a softening point of 100 to 300° C. Chemically, the presently preferred polycarbonate is the polycarbonic acid ester of 4,4'-dihydroxy-diphenyl-2,2-propane

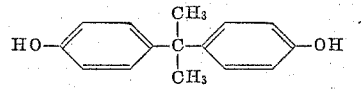

and corresponds to the formula

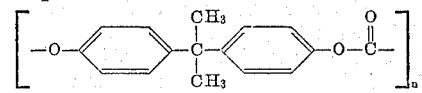

see Source Book of the New Plastics, by Herbert R. Simonds, vol. 1, page 130 et seq., published 1959 by Reinhold, New York.

The properties of the products of the invention may be modified in minor respects in per se essentially conventional manner by incorporating into the mixture of polycarbonate resin and crystalline propylene polymer an appropriate quantity of any one or more of a wide variety of organic and inorganic additaments, such e.g. as diatomaceous earth, talc, silica, titanium oxide, etc.

The following examples set forth, solely by way of illustration, presently preferred embodiments of the invention.

*Example 1*

Ninety-five parts by weight of crystalline (isotactic) propylene polymer having an intrinsic viscosity of 1.52 (as measured in tetrahydronaphthalene solution at 135° C.) are intimately mixed with five parts by weight of 4,4'-dihydroxy-diphenyl-2,2-propane polycarbonic acid ester (hereinafter referred to as "polycarbonate resin"). This polycarbonate resin is in the form of powder or very small lumps having a softening point of 160° C. Mixing is effected at ambient temperature (20 to 30° C.), after which the mixture is heated to 270° C. and the so-obtained melt extruded through a spinnerette having thirty nozzle holes with a diameter of 0.5 mm. each.

The filaments thus obtained are then heat-stretched in per se conventional manner to about three times their original length to effect orientation and then heat-treated in per se conventional manner to effect stabilization. The resultant fiber then has the following characteristics:

Dry strength, grams per denier (g./d.) _____ 4.20
Dry elongation (percent) _____ 43.0
Resilience:
  At 3% elongation _____ 97
  At 5% elongation _____ 93

Good results are likewise obtained when the heat stretching is carried to different extents than that above indicated, which is preferred.

The thus-produced fiber is dyed with 3%, based on the fiber weight, of Dispersol Fast Crimson B (C.I. No. 11,115) in 50 times the amount of an aqueous solution containing 0.1% by weight of sodium salt of the sulfuric acid ester of 9,10-octadecenol-1 as dyeing auxiliary, at 75° C. for 90 minutes. Thereafter the fiber is further treated with a 0.3% by weight aqueous solution of the dyeing auxiliary at 70° C. for 30 minutes.

The fiber thus dyed shows a very deep and vivid scarlet coloration with good fastness to light, moisture, washing and rubbing.

The dyeing auxiliary employed in the present example may be replaced, without significantly altering the realized results, by sodium salts of other higher alcohol sulfuric acid esters, such e.g. as the sodium salt of the sulfuric acid ester of the mixture of fatty alcohols made by reducing the mixed fatty acids of coconut oil (so-called "coconut fatty alcohol"). Another very useful auxiliary is the sodium salt of the higher alcohol sulfuric acid ester available commercially as "Monogen" detergent (Dai-Ichi Kogyo Seiyaku Co., Ltd. in Japan).

Example 2

(a) The procedure according to the first two paragraphs of Example 1 are repeated, except that 100 parts by weight of the crystalline polypropylene and 1 part by weight of the polycarbonate resin are employed.

(b) The procedure according to the first two paragraphs of Example 1 are repeated, except that 100 parts by weight of the crystalline polypropylene and 3 parts by weight of the polycarbonate resin are employed.

(c) The procedure according to the first two paragraphs of Example 1 are repeated, except that 100 parts by weight of the crystalline polypropylene and 5 parts by weight of the polycarbonate resin are employed.

The resultant fibers have the following characteristics:

|     | Dry strength (g./d.) | Dry elongation (percent) |
|-----|---------------------|--------------------------|
| (a) | 5.20                | 48.0                     |
| (b) | 4.51                | 45.8                     |
| (c) | 4.24                | 42.2                     |

Dyed after the manner precedingly described the resultant fibers yield deep and vivid dyeings with Cibacet Blue F3R (C.I. No. 61,505) and with Dispersol Fast Crimson B (C.I. No. 11,115); these dyeings are also characterized by very good fastness to light, moisture, washing and rubbing.

Example 3

The procedure according to the first two paragraphs of Example 1 are repeated, except that 90 parts by weight of the crystalline propylene and 10 parts by weight of the polycarbonate resin are employed.

The thus-produced fiber is dyed with 5%, on the basis of the fiber weight, of Sunchromine Brilliant Violet R (an acidic mordant dye having a C.I. No. 43,565) in 100 times by weight the amount of an aqueous bath containing in solution 0.1% by weight of the sodium salt of the sulfuric acid ester of 9,10-octadecenol-1 as dyeing auxiliary and 0.5% by weight of acetic acid at 95° C. for 90 minutes.

The resultant dyeing is of good depth and vividness and has good fastness to light, moisture, washing and rubbing.

As in Example 1, the dyestuff may be replaced by another (acidic mordant) dyestuff and the auxiliary by another auxiliary, e.g. "Monogen."

While the several foregoing illustrative examples employ 4,4'-dihydroxy-diphenyl-2,2-propane polycarbonic acid ester as polycarbonate resin, this is solely because the latter is the preferred resin to be used according to the invention. It is not hereby intended, however, to exclude other polycarbonate resins from the scope and ambit of the invention, since it is possible with essentially similar results to employ other specific polycarbonate resins as the material to be admixed with the crystalline polypropylene. Thus, polycarbonate resin of the examples may be replaced by corresponding amounts of other polycarbonate resins, and generally by any polycarbonate resin made up of recurring units of the formula

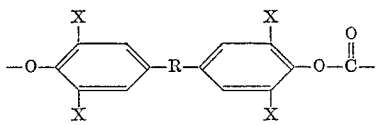

wherein R is a member selected from the group consisting of alkylene with 1 to 8 carbon atoms, and cycloalkyl with 5 to 6 carbon atoms, and each X is a member selected from the group consisting of H, lower alkyl and halogen.

The crystalline polypropylene may be any one of the crystalline (isotactic) polypropylenes now commercially available; cf. for example Pro-fax; Moplen; etc. (See Source Book of the New Plastics, by Herbert R. Simonds, vol. 1, pages 177 et seq., pages 232 et seq., and others.)

Having thus disclosed the invention, what is claimed is:

1. Spun fiber consisting essentially of a homogeneous admixture of crystalline polypropylene and from 1 to 20% by weight of 4,4'-dihydroxy-diphenyl-2,2-propane polycarbonic acid ester resin having a softening point of 100 to 300° C.

2. Spun fiber consisting essentially of a homogeneous admixture of crystalline polypropylene and from 1 to about 5% by weight thereof of 4,4'-dihydroxy-diphenyl-2,2-propane polycarbonic acid ester resin having a softening point of 100 to 300° C.

3. A method of producing dyed polymeric propylene synthetic fiber, which comprises homogeneously admixing crystalline polypropylene with 1 to 20% by weight thereof of polycarbonate resin having a softening point of 100 to 300° C. and made up of recurring units of the formula

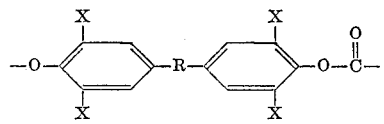

wherein R is a member selected from the group consisting of alkylene with 1 to 8 carbon atoms, and X is a member selected from the group consisting of H, lower alkyl and halogen, heating the mixture to convert it into the molten state, converting the molten mass into shaped form and dyeing said fiber with a dye selected from the group consisting of acid mordant dyes and disperse dyes.

4. A method according to claim 3, wherein the polycarbonate resin is 4,4'-dihydroxy-diphenyl-2,2-propane polycarbonic acid ester.

5. A method of producing dyed polymeric propylene synthetic fiber which comprises homogeneously admixing crystalline polypropylene with 1 to 20% by weight thereof of polycarbonate resin having a softening point of 100 to 300° C. and made up of recurring units of the formula

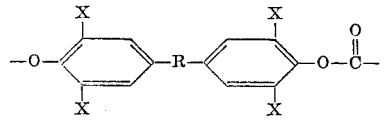

wherein R is a member selected from the group consisting of alkylene with 1 to 8 carbon atoms, and X is a member selected from the group consisting of H, lower alkyl and halogen, heating the mixture to convert it into the molten state, and then converting the molten mass into the form of fibers selected from the group consisting of acid mordant dyes and dispersed dyes.

6. A method according to claim 5, wherein the polycarbonate resin is 4,4'-dihydroxy-diphenyl-2,2-propane polycarbonic acid ester.

7. A method of producing dyed polymeric propylene synthetic fiber, which comprises homogeneously admixing crystalline polypropylene with 1 to about 5% by weight thereof of polycarbonate resin having a softening point of 100 to 300° C. made up of recurring units of the formula

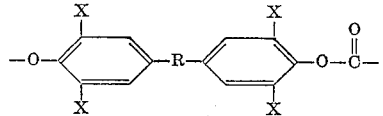

wherein R is a member selected from the group consisting of alkylene with 1 to 8 carbon atoms, and X is a member selected from the group consisting of H, lower alkyl and halogen, heating the mixture to convert it into the molten state, converting the molten mass into the form of fibers selected from the group consisting of acid mordant dyes and dispersed dyes.

8. A method according to claim 7, wherein the polycarbonate resin is 4,4'-dihydroxy-diphenyl-2,2-propane polycarbonic acid ester.

9. Spun fiber consisting essentially of a homogeneous admixture of crystalline polypropylene and from 1 to 20% by weight thereof of polycarbonate resin having a softening point of 100 to 300° C. and made up of recurring units of the formula

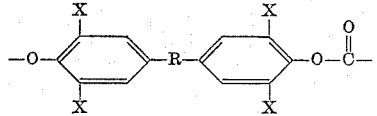

wherein R is a member selected from the group consisting of alkylene with 1 to 8 carbon atoms, and X is a member selected from the group consisting of H, lower alkyl and halogen.

10. Spun fiber consisting essentially of a homogeneous admixture of crystalline polypropylene and from 1 to about 5% by weight thereof of polycarbonate resin having a softening point of 100 to 300° C. and made up of recurring units of the formula

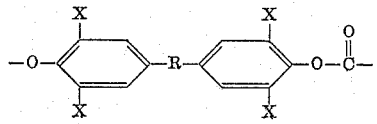

wherein R is a member selected from the group consisting of alkylene with 1 to 8 carbon atoms, and X is a member selected from the group consisting of H, lower alkyl and halogen.

11. A dyeable fiber comprising a mixture of polypropylene and a solid high melting polycarbonate resin made up of recurring units of the formula

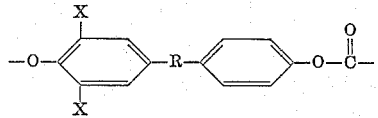

wherein R is a short chain alkylene group and X is a member of the group consisting of H and methyl.

References Cited by the Examiner

UNITED STATES PATENTS

| | | | |
|---|---|---|---|
| 2,789,970 | 4/1957 | Reynolds et al. | 260—77.50 |
| 3,013,998 | 12/1961 | Battaglioli. | |
| 3,053,810 | 9/1962 | Griehl | 260—77.5 |

FOREIGN PATENTS

| | | |
|---|---|---|
| 578,795 | 6/1959 | Canada. |
| 808,486 | 2/1959 | Great Britain. |

OTHER REFERENCES

Chem. and E. News, Aug. 11, 1958, pp. 51 and 52.

NORMAN G. TORCHIN, *Primary Examiner.*

DONALD ARNOLD, MORRIS O. WOLK, ABRAHAM H. WINKELSTEIN, B. S. LEON, D. LEVY,
*Assistant Examiners.*